(12) United States Patent
Joshi et al.

(10) Patent No.: US 6,938,015 B2
(45) Date of Patent: Aug. 30, 2005

(54) METHOD FOR PROVIDING DATABASE SECURITY

(75) Inventors: Ajit P. Joshi, Beaverton, OR (US); Rick P. Mangold, Forest Grove, OR (US); Curt E. Jutzi, Lake Oswego, OR (US)

(73) Assignee: Intel Corporation, Santa Clara, CA (US)

( * ) Notice: Subject to any disclaimer, the term of this patent is extended or adjusted under 35 U.S.C. 154(b) by 732 days.

(21) Appl. No.: 09/955,246

(22) Filed: Sep. 17, 2001

(65) Prior Publication Data

US 2003/0056210 A1 Mar. 20, 2003

(51) Int. Cl.[7] .............................................. H04L 9/00
(52) U.S. Cl. .......................................... 705/51; 705/52
(58) Field of Search ...................... 705/51–53; 370/352

(56) References Cited

U.S. PATENT DOCUMENTS

| 5,410,598 | A | 4/1995 | Shear ........................... 705/53 |
| 6,188,683 | B1 | 2/2001 | Lang et al. .................. 370/352 |
| 6,804,225 | B1 | 10/2004 | Lang ........................... 370/352 |
| 6,822,954 | B2 | 11/2004 | McConnell et al. ........ 370/352 |

FOREIGN PATENT DOCUMENTS

| EP | 0504843 A2 | 9/1992 |
| EP | 0837383 A2 | 4/1998 |
| EP | 1072979 A2 | 1/2001 |
| WO | WO 01/06374 A2 | 1/2001 |
| WO | WO 01/09789 A1 | 2/2001 |

OTHER PUBLICATIONS

"Co/SESSION version 2.4" (Jan. 29, 1988) New product annoucement.*
"New patent meters user Activity", Business Wire(Dec. 9, 1997) p. 12090010.*
International Search Report, PCT?US02/25315, mailed Oct. 28, 2003.

* cited by examiner

*Primary Examiner*—Salvatore Cangialosi
(74) *Attorney, Agent, or Firm*—Blakely, Sokoloff, Taylor and Zafman (57) ABSTRACT

According to one embodiment, a system is disclosed. The system includes a server computer, a transmission medium coupled to the server computer and a client computer coupled to the transmission medium. The client computer includes a security component that has exclusive access to a log stored at the client computer.

27 Claims, 6 Drawing Sheets

FIG. 6

METHOD FOR PROVIDING DATABASE SECURITY

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

FIELD OF THE INVENTION

The present invention relates to computer systems; more particularly, the present invention relates to database security.

BACKGROUND

A set top appliance is a device that has the capability to play audio and video content. Set top appliances typically keep a journal of billable and non-billable activities that is frequently transmitted to a central database at a server computer. Billable activities that occur on a set top appliance often require secured transactions. Typically, the journal of activities is stored locally to the hard drive of the set top appliance. However, most set top appliances are unsecured environments that are accessible by a system user. As a result, a user of a set top appliance may readily access the journal of billable activities in order to alter the journal, thus potentially defrauding the service provided by the server.

BRIEF DESCRIPTION OF THE DRAWINGS

The present invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

A method for providing secure storage and transfer of databases and logs is described. According to one embodiment, a billing log is securely stored at a client computer system. Upon a user at the client computer selecting to play content originally obtained from a source device via a transmission medium, a billing record is transmitted to a security component within the client. In one embodiment, the billing record indicates that a fee for receiving the content should be billed to the client user. The billing record is entered into a log at the client. The log is encrypted, signed and stored at the client.

In another embodiment, the billing log is securely transmitted to a server. A billing component within the client receives the log from the security component. The billing component transmits the log to a billing component within the server. The billing log is subsequently received at a security component within the server where it is decrypted, verified and stored in a database. Subsequently, the security component checks the validity of a token received with the log. As a result, the log is validated and the token is compared to a token stored in the database. In a further embodiment, a new log and token are subsequently generated and transmitted to the client. The new token is stored in the database for subsequent comparisons.

In the following description, numerous details are set forth. It will be apparent, however, to one skilled in the art, that the present invention may be practiced without these specific details. In other instances, well-known structures and devices are shown in block diagram form, rather than in detail, in order to avoid obscuring the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

The instructions of the programming language(s) may be executed by one or more processing devices (e.g., processors, controllers, control processing units (CPUs), execution cores, etc.).

Figure 1:
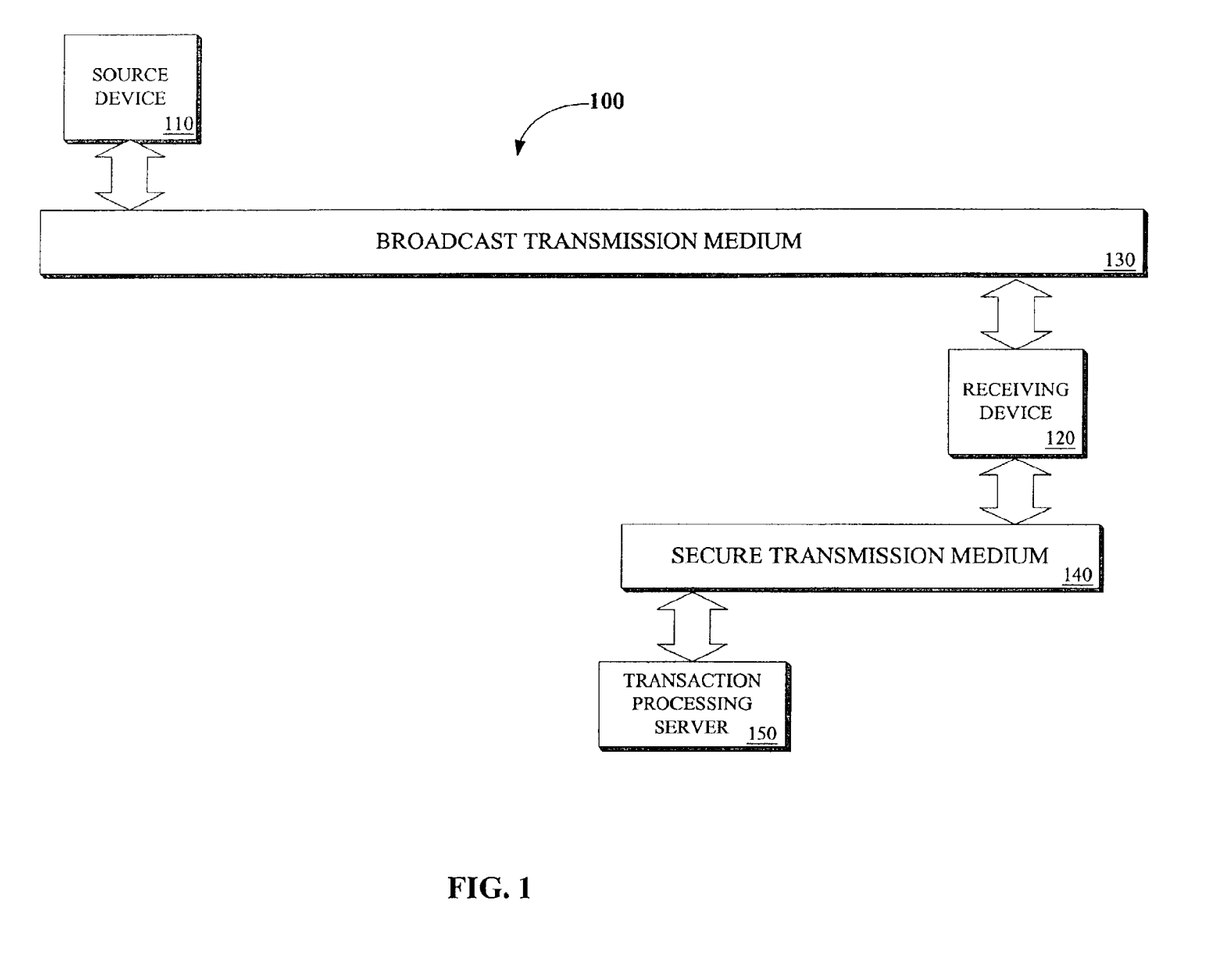
FIG. 1 illustrates one embodiment of a system.

FIG. 1 illustrates one embodiment of system 100. System 100 includes a computer system 110 and a computer system 120 coupled via a broadcast transmission medium 130. In one embodiment, computer system 110 operates as a source device that sends content to computer system 120, operating as a receiving device. The content may be, for example, a data file, an executable, streaming audio and video, or other digital objects. The content is sent via data transmission medium 130.

The data transmission medium 130 may be one of many mediums such as a satellite transmission, an internal network connection, an Internet connection, or other connections. Transmission medium 130 may be connected to a plurality of untrusted routers (not shown) and switches (not shown) that may include the integrity of the object that is transmitted.

According to one embodiment, computer system 110 is a server computer, while computer system 120 is a client set-top appliance. In a further embodiment, the set-top appliance is implemented for cable television or digital satellite services that receive content from computer system 110. However, in other embodiments, computer system 120 may be a personal computer (PC) coupled to computer system 110, wherein the transmission medium is the Internet.

System 100 also includes a transaction processing server 150 coupled to computer system 120 via a secure transmission medium 140. Transaction processing server 150 receives billing log information from computer system 120. According to one embodiment, transmission medium 140 is a secure back channel that uses standard cryptographic methods to secure transmissions between receiving device 120 and transaction processing server 150.

Figure 2:
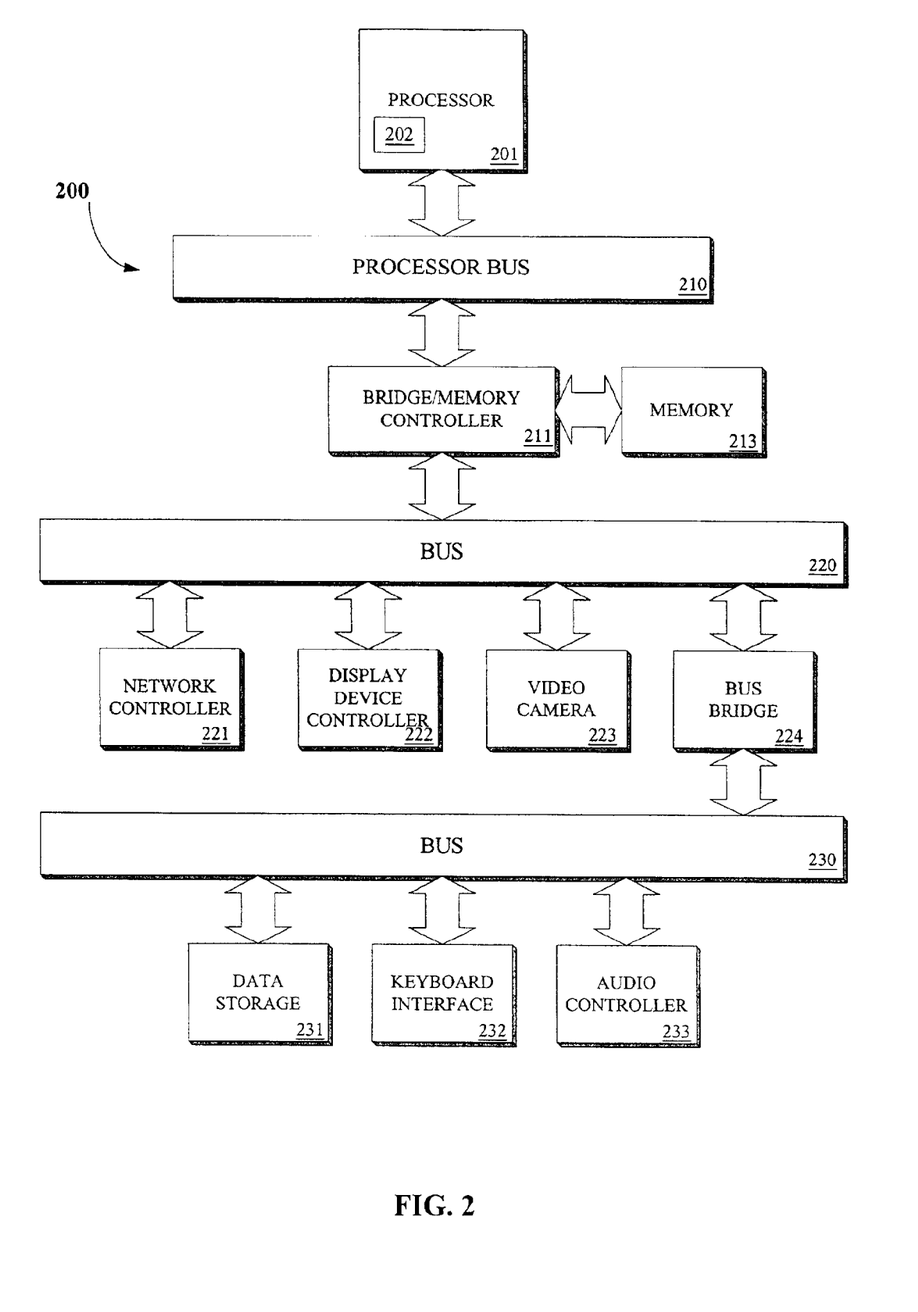
FIG. 2 is a block diagram of one embodiment of a computer system.

FIG. 2 is a block diagram of one embodiment of a computer system 200. Computer system 200 may be implemented as computer system 110, computer system 120 or processing server 150 (all shown in FIG. 1). Computer system 200 includes a processor 201 that processes data signals. Processor 201 may be a complex instruction set computer (CISC) microprocessor, a reduced instruction set computing (RISC) microprocessor, a very long instruction word (VLIW) microprocessor, a processor implementing a combination of instruction sets, or other processor device.

In one embodiment, processor 201 is a processor in the Pentium® family of processors including the Pentium® II family and mobile Pentium® and Pentium® II processors available from Intel Corporation of Santa Clara, Calif. Alternatively, other processors may be used. FIG. 2 shows an example of a computer system 200 employing a single processor computer. However, one of ordinary skill in the art will appreciate that computer system 200 may be implemented using multiple processors.

Processor 201 is coupled to a processor bus 210. Processor bus 210 transmits data signals between processor 201 and other components in computer system 200. Computer system 200 also includes a memory 213. In one embodiment, memory 213 is a dynamic random access memory (DRAM) device. However, in other embodiments, memory 213 may be a static random access memory (SRAM) device, or other memory device.

Memory 213 may store instructions and code represented by data signals that may be executed by processor 201. According to one embodiment, a cache memory 202 resides within processor 201 and stores data signals that are also stored in memory 213. Cache 202 speeds up memory accesses by processor 201 by taking advantage of its locality of access. In another embodiment, cache 202 resides external to processor 201.

Computer system 200 further comprises a bridge memory controller 211 coupled to processor bus 210 and memory 213. Bridge/memory controller 211 directs data signals between processor 201, memory 213, and other components in computer system 200 and bridges the data signals between processor bus 210, memory 213, and a first input/output (I/O) bus 220. In one embodiment, I/O bus 220 may be a single bus or a combination of multiple buses.

In a further embodiment, I/O bus 220 may be a Peripheral Component Interconnect adhering to a Specification Revision 2.1 bus developed by the PCI Special Interest Group of Portland, Oreg. In another embodiment, I/O bus 220 may be a Personal Computer Memory Card International Association (PCMCIA) bus developed by the PCMCIA of San Jose, Calif. Alternatively, other busses may be used to implement I/O bus. I/O bus 220 provides communication links between components in computer system 200.

A network controller 221 is coupled to I/O bus 220. Network controller 221 links computer system 200 to a network of computers (not shown in FIG. 2) and supports communication among the machines. A display device controller 222 is also coupled to I/O bus 220. Display device controller 222 allows coupling of a display device to computer system 200, and acts as an interface between the display device and computer system 200.

In one embodiment, display device controller 222 is a monochrome display adapter (MDA) card. In other embodiments, display device controller 222 may be a color graphics adapter (CGA) card, an enhanced graphics adapter (EGA) card, an extended graphics array (XGA) card or other display device controller.

The display device may be a television set, a computer monitor, a flat panel display or other display device. The display device receives data signals from processor 201 through display device controller 222 and displays the information and data signals to the user of computer system 200. A video camera 223 is also coupled to I/O bus 220.

Computer system 200 includes a second I/O bus 230 coupled to I/O bus 220 via a bus bridge 224. Bus bridge 224 operates to buffer and bridge data signals between I/O bus 220 and I/O bus 230. I/O bus 230 may be a single bus or a combination of multiple buses. In one embodiment, I/O bus 230 is an Industry Standard Architecture (ISA) Specification Revision 1.0a bus developed by International Business Machines of Armonk, N.Y. However, other bus standards may also be used, for example Extended Industry Standard Architecture (EISA) Specification Revision 3.12 developed by Compaq Computer, et al.

I/O bus 230 provides communication links between components in computer system 200. A data storage device 231 is coupled to I/O bus 230. I/O device 231 may be a hard disk drive, a floppy disk drive, a CD-ROM device, a flash memory device or other mass storage device. A keyboard interface 232 is also coupled to I/O bus 230. Keyboard interface 232 may be a keyboard controller or other keyboard interface.

In addition, keyboard interface 232 may be a dedicated device or can reside in another device such as a bus controller or other controller. Keyboard interface 232 allows coupling of a keyboard to computer system 200 and transmits data signals from the keyboard to computer system 200. An audio controller is also coupled to I/O bus 230. Audio controller 233 operates to coordinate the recording and playing of sounds.

Figure 3:
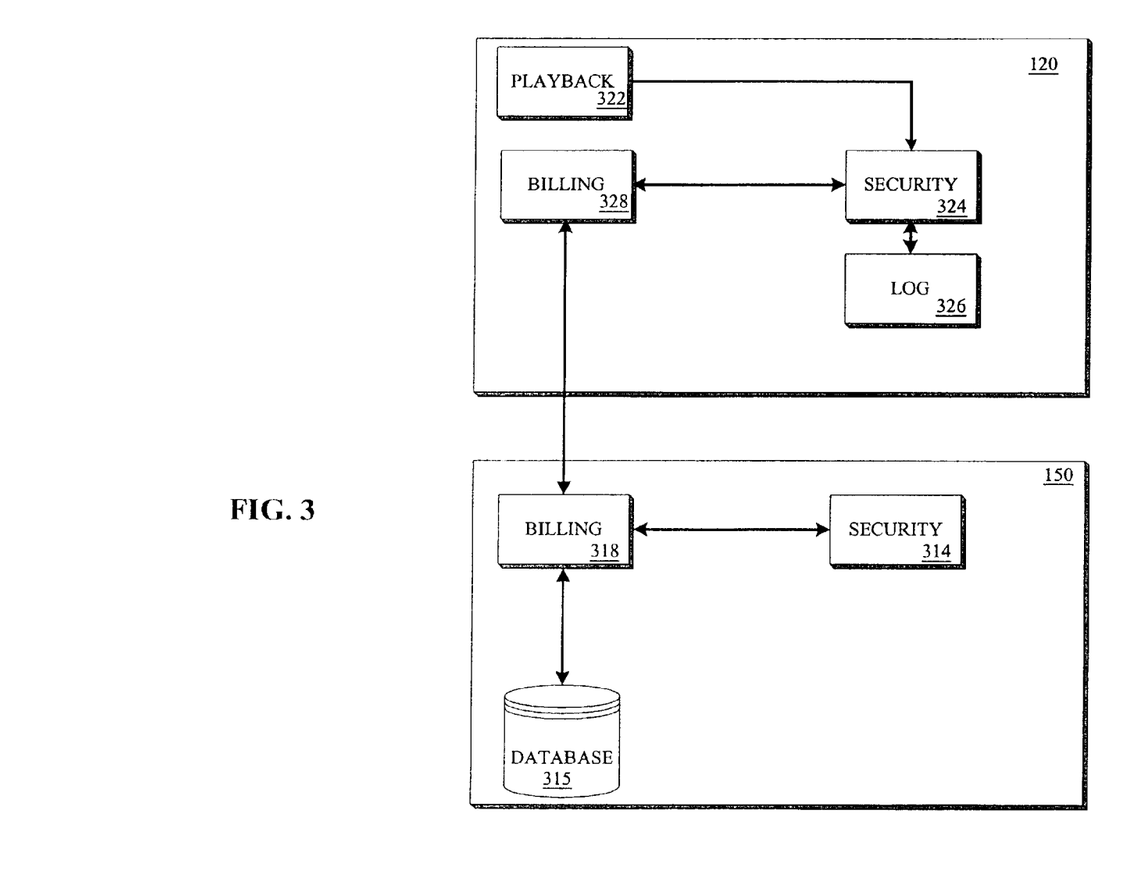
FIG. 3 is a block diagram of one embodiment of a source device and a receiving device.

According to one embodiment, security is provided for data stored in a log or database within an unsecured environment. FIG. 3 is a block diagram of one embodiment of computer system 120 and processing server 150 coupled via a secure back channel. Referring to FIG. 3, computer system 120 includes a playback component 322, a security component 324, a database (or log) 326 and a billing component 328.

According to one embodiment, computer system 120 plays media data (e.g., music and video content) received from source computer system 110. However, computer system 120 is typically an insecure environment at which it is typically undesirable to maintain data that is confidential to transaction processing server 150, as the owner of computer system 120 has access to all data within the platform.

Playback component 322 is implemented to play the content received from source computer system 110. For example, playback component 322 may initiate the playback of a movie being received at computer system 120. In one embodiment, playback component 322 generates a billing record that is eventually transmitted to transaction processing server 150 for future billing of the computer system 120 owner.

In a further embodiment, playback component 322 is implemented by software and resides in memory 213 (FIG. 2) as sequences of instructions. Nevertheless one of ordinary skill in the art will appreciate that the modules may be implemented by hardware as components coupled to I/O bus 220 (FIG. 2) or a combination of both hardware and software.

Security component 324 encrypts billing record entries that are stored in log 326. Further, security component 324 enters billing entries into log 326 each time billable content is played at playback component 322. According to one embodiment, security component 324 is a tamper resistant component that implements a public-key authentication protocol and symmetric key encryption protocol to encrypt billing records. Log 326 is a journal of activity for computer system 110. In one embodiment, log 326 stores all billing record entries at data storage 231 of computer system 120. Log 326 can be updated regularly by security component 324.

According to one embodiment, security component 324 is the only component within computer system 120 that is aware of log 326. Thus, security component 324 provides for the secure storage of log 326 data at computer system 120 without the owner of the platform having access to the data. In a further embodiment, log 326 is stored at different locations of data storage 231. Billing component 328 transmits log 326 to transaction processing server 150.

According to one embodiment, log 326 is transmitted to transaction processing server 150 at regularly scheduled intervals. However, in other embodiments, log 326 is transmitted from billing component 328 upon request from transaction processing server 150. In a further embodiment, log 326 is encrypted once more prior to transmission to transaction processing server 150.

Figure 4:
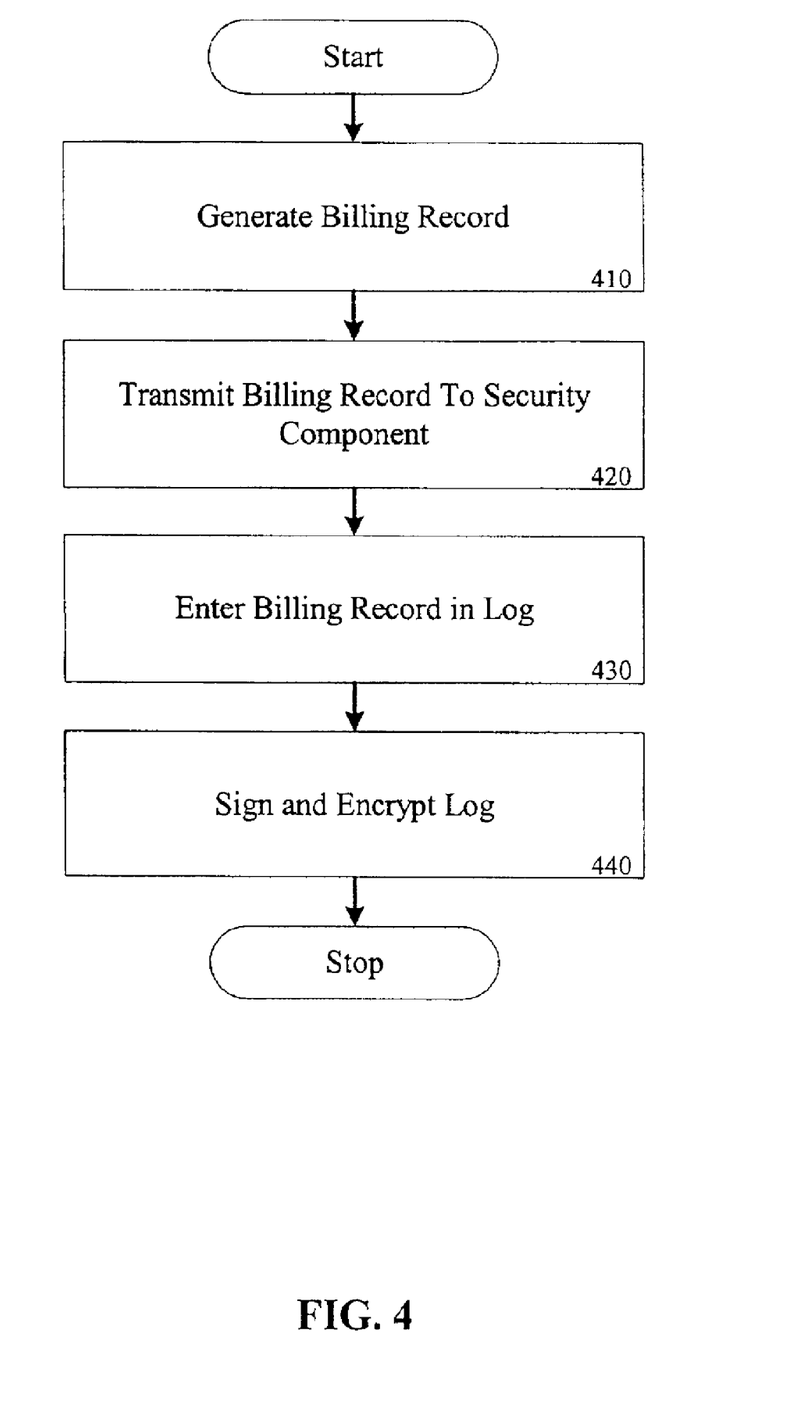
FIG. 4 is a flow diagram for one embodiment of the operation of a receiving device.

FIG. 4 is a flow diagram for one embodiment of the operation of computer system 120 storing a billing entry into log 326 upon content being selected for playback by a user of computer system 120. According to one embodiment, the content is a movie that the user wishes to purchase in order to view for a limited time period (e.g., a Pay Per View movie).

At processing block 410, a billing record is generated in response to selecting content for playback. At processing block 420, playback component 322 transmits a billing record to security component 324. The billing record indicates that the fee for viewing the content should be billed to the owner of computer system 120.

At processing block 430, security component 324 enters the billing record into log 326. As described above, security component 324 is the only component within computer system 120 that has knowledge of where log 326 is stored, and thus the only component that can access log 326. At processing block 440, log 326 is encrypted. Subsequently, the content may be transmitted from computer system 120 to transaction processing server 150.

Referring back to FIG. 3, transaction processing server 150 includes a billing component 318, a security component 314 and a database 315. Billing component 318 receives log 326 from billing component 328. In one embodiment, billing component 318 also transmits a new log 326 to computer system 120 after receiving the existing log. Security component 314 decrypts log 326 in order to verify its integrity.

In addition, after verifying the integrity of the log and validating a token, billing component 318 generates a new token (e.g., time and date stamps) that is transmitted to computer system 120 as a part of the new log. As a result, security component 314 verifies the integrity of each received log 326 by checking the time and date stamps. Database 315 is used to store log 326 and token data. According to one embodiment, database 315 is a relational database.

Figure 5:
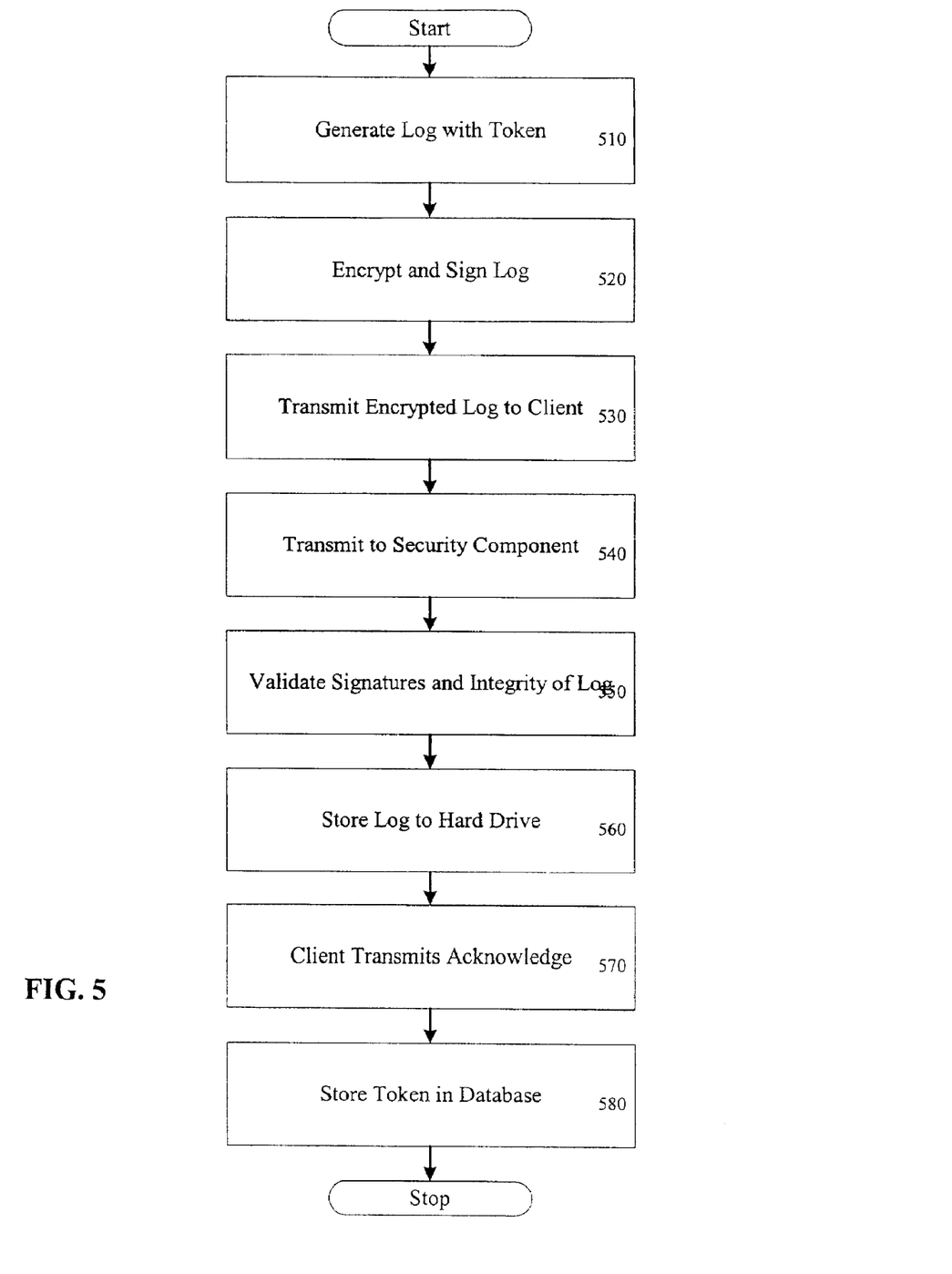
FIG. 5 is a flow diagram for one embodiment of generating a log.

FIG. 5 is a flow diagram for one embodiment of generating a new log at computer system 110. At processing block 510, transaction processing server 150 generates a new log with token time and data stamps. As described above, a new log is generated upon transaction processing server 150 receiving a pre-existing log from computer system 120.

At processing block 520, security component 314 encrypts and signs the new log 326. At processing block 530, the encrypted log is transmitted to computer system 120 via transmission medium 140. At processing block 540, log 326 is forwarded to security component 324. At processing block 550, security component 324 validates the signatures and the integrity of log 326.

At processing block 560 security component 324 retrieves the new token and writes log 326 to the computer system 120 hard drive (e.g., data storage 231). At processing block 570, computer system 120 transmits an acknowledgement to transaction processing server 150 acknowledging the receipt of the new log. At processing block 580, the new token is stored in database 315.

Figure 6:
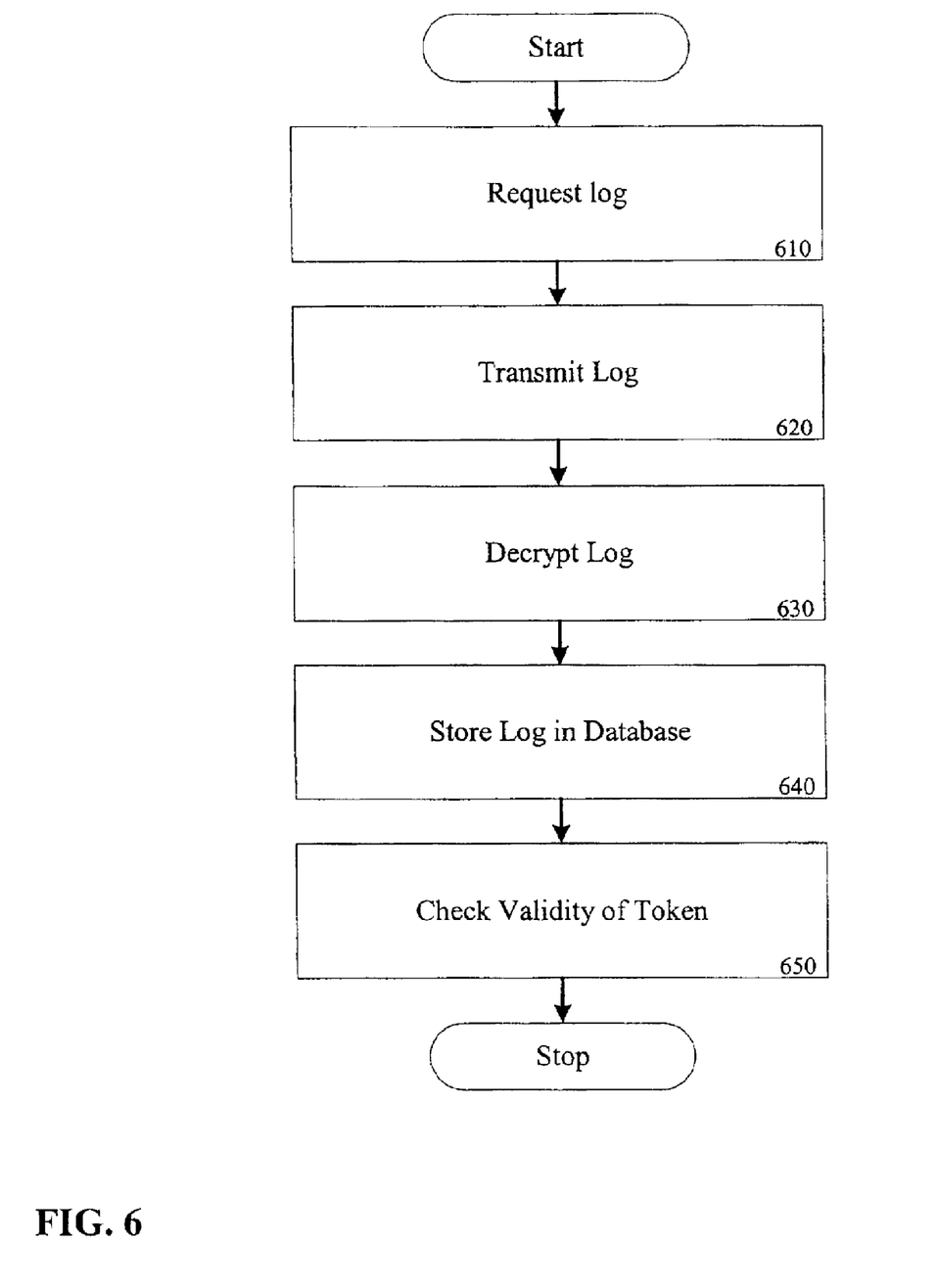
FIG. 6 is a flow diagram for one embodiment of securely transferring a log.

After new log 326 is stored, it may be accessed by security component 324 on occasion, as described above with respect to FIG. 4. As discussed above, log 326 may be securely transmitted to transaction processing server 150 at predetermined intervals. FIG. 6 is a flow diagram for one embodiment of securely transferring log 326 from computer system 120 to transaction processing server 150.

At processing block 610, billing component 328 transmits a request to security component 324 to receive log 326. At processing block 620, billing component 328 transmits log 326 to billing component 318 within transaction processing server 150 upon receiving log 326. At processing block 630, billing component 318 transmits log 326 to security component 314 where log 326 is decrypted.

At processing block 640, log 326 is stored in database 315. At processing block 650, security component 314 checks the validity of the token from the received log 326. As a result, security component 314 validates the signature of log 326 and compares the token stored in database 315.

The method of securely storing and transmitting a billing log involves information from both a client and server which makes it more difficult for a billing log or database to be tampered with.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as the invention.

What is claimed is:

1. A system comprising:
   a server computer;
   a first transmission medium coupled to the server computer; and
   a client computer, coupled to the first transmission medium, including:
      a log to store billing entries; and
      a security component having exclusive access to the log to enter the billing entries into the log and to secure the log.

2. The system of claim 1 further comprising:
   a second transmission medium coupled to the client computer; and
   a source device coupled to the second transmission medium.

3. The system of claim 2 wherein the client computer further comprises:
   a playback component that transmits a log entry to the security component upon receiving a request to play content received from the source device via the second transmission medium; and
   a billing component that transmits the log to the server computer via the first transmission medium.

4. The system of claim 3 wherein the billing component transmits the log to the server computer upon receiving a request from the server computer.

5. The system of claim 3 wherein the billing component transmits the log to the server computer at predetermined time intervals.

6. The system of claim 1 wherein the client computer is a personal computer.

7. The system of claim 1 wherein the client computer is a set top appliance.

8. The system of claim 1 wherein the server computer comprises:
   a billing component that receives the log from the client computer via the first transmission medium;
   a second security component that decrypts and verifies the integrity of the log; and
   a database that stores the log.

9. The system of claim 2 wherein the first transmission medium comprises a secure back channel that secures transmissions between the server computer and the client computer and the second transmission medium is a broadcast channel.

10. The system of claim 2 wherein the second transmission medium comprises an internal network connection.

11. The system of claim 2 wherein the second transmission medium comprises a satellite transmission.

12. A method comprising:
    generating a billing record at a computer system;
    receiving the billing record at a security component within the computer system;
    the security component inserting the billing record into a log; and
    encrypting the log.

13. The method of claim 12 further comprising receiving a request at the computer system to retrieve media content that is to be played at the computer system.

14. The method of claim 12 further comprising writing the log to a data storage device within the computer system.

15. A software product having one or more recordable media having stored thereon executable instructions which, when executed by a processing device, causes the processing device to:
    generate a billing record at a computer system;
    receive the billing record at a security component within the computer system;
    insert the billing record into a log; and
    encrypt the log.

16. The software product of claim 15 further comprising causing the processing device to receive a request at the computer system to retrieve media content that is to be played at the computer system.

17. The software product of claim 15 further comprising causing the processing device to write the log to a data storage device within the computer system.

18. A method comprising:
    receiving an encrypted billing log at a server computer from a client computer via a secure back channel;
    decrypting the billing log at a security component within the server computer; and
    storing the billing log at a database.

19. The method of claim 18 further comprising testing the validity of the billing log.

20. The method of claim 19 wherein testing the validity of the billing log comprises:
    validating a digital signature in order to authenticate the billing log; and
    comparing a first token value stored in the database with a second token value included with the billing log received over the secure back channel.

21. The method of claim 20 further comprising:
    generating a third token value;
    generating a second billing log at the server computer that includes the third token value; and
    transmitting the second billing log and the third token value to the client computer via the secure back channel.

22. The method of claim 21 further comprising:

signing the second billing log with a second digital signature; and encrypting the second billing log prior to transmitting the second billing log to the client computer.

23. A software product having one or more recordable media having stored thereon executable instructions which, when executed by a processing device, causes the processing device to:

receive an encrypted billing log at a server computer from a client computer via a secure back channel;

decrypt the billing log at a security component within the server computer; and store the billing log at a database.

24. The software product of claim 23 further comprising causing the processing device to test the validity of the billing log.

25. The software product of claim 24 wherein causing the processing device to test the validity of the billing log further causes the processing device to:

validate a digital signature in order to authenticate the billing log; and compare a first token value stored in the database with a second token value included with the billing log received over the secure back channel.

26. The software product of claim 25 further comprising causing the processing device to:

generate a third token value;

generate a second billing log at the server computer that includes the third token value; and transmit the second billing log and the third token value to the client computer via the secure back channel.

27. The software product of claim 25 further comprising causing the processing device to:

sign the second billing log with a second digital signature; and encrypt the second billing log prior to transmitting the second billing log to the client computer.

* * * * *